United States Patent
Molloy

(10) Patent No.: US 6,909,744 B2
(45) Date of Patent: Jun. 21, 2005

(54) PROCESSOR ARCHITECTURE FOR COMPRESSION AND DECOMPRESSION OF VIDEO AND IMAGES

(75) Inventor: Stephen A. Molloy, Los Gatos, CA (US)

(73) Assignee: Redrock Semiconductor, Inc., Sunnyvale, CA (US)

( * ) Notice: Subject to any disclaimer, the term of this patent is extended or adjusted under 35 U.S.C. 154(b) by 651 days.

(21) Appl. No.: 09/733,612

(22) Filed: Dec. 8, 2000

(65) Prior Publication Data

US 2001/0046260 A1 Nov. 29, 2001

Related U.S. Application Data

(60) Provisional application No. 60/170,082, filed on Dec. 9, 1999, and provisional application No. 60/170,002, filed on Dec. 9, 1999.

(51) Int. Cl.[7] .......................... H04N 7/12; H04N 11/02
(52) U.S. Cl. ................................................. 375/240.01
(58) Field of Search ............................. 341/50, 59, 67; 386/33; 348/14.13; 375/240, 240.01

(56) References Cited

U.S. PATENT DOCUMENTS

| | | | | |
|---|---|---|---|---|
| 5,926,208 A | * | 7/1999 | Noonen et al. | 348/14.13 |
| 5,949,484 A | * | 9/1999 | Nakaya et al. | 348/384.1 |
| 6,192,188 B1 | * | 2/2001 | Dierke | 386/95 |

OTHER PUBLICATIONS

Aono et al, A Video Digital Signal Processor with a Vector–Pipeline Architecture, Dec. 1992, IEEE Journal of Solid–State Circuits vol. 27 No. 12, pp. 1886–1894.*

Toyokura et al, "A Video DSP with a Macroblock–Level–Pipeline and SIMD Type Vector–Pipeline Architecture for MPEG2 CODEC", Dec. 1994, IEEE Journal of Solid–State Circuits vol. 29 No. 12, pp. 1474–1481.*

Toyokura et al, "A Video Digital Signal Processor with a Vector–Pipeline Architecture", 1992, IEEE Solid–State Circuits Conference, pp. 72–73.*

* cited by examiner

Primary Examiner—Chris Kelley
(74) Attorney, Agent, or Firm—William L. Paradice, III

(57) ABSTRACT

A video encoder/decoder includes a vector pipeline unit and is configured only once by a processor to encode/decode data in accordance with any one of the JPEG, MPEG1, MPEG2 or MPEG4, H.261 or H.263 compression standards. The configuration data is stored in a configuration register of the video encoder/decoder. An optional ROM stores the configuration data for subsequent reading and loading—by the processor—into the configuration register. The vector pipeline unit includes: a run-length decoder, a binary arithmetic logic unit, a binary multiplier/divider, an accumulator, a barrel shifter, a round/modify unit, a saturate logic unit, a status register and a run-length encoder. Each component of the vector pipeline unit is optionally enabled or disabled. By disabling one or more components of the vector pipeline unit the power consumed by the encoder/decoder is reduced. The vector pipeline, after being configured continuously encodes/decodes vectors of data according to the configured standard, without requiring any additional configuration or software programming. The status register gathers statistical data on the saturated data and supplies the statistical data to the processor, thereby, further improving the performance of the video encode/decoder. The video encoder/decoder encodes/decodes data based on any other compression standard with additional configuration or software programming.

29 Claims, 3 Drawing Sheets

PROCESSOR ARCHITECTURE FOR COMPRESSION AND DECOMPRESSION OF VIDEO AND IMAGES

CROSS-REFERENCES TO RELATED APPLICATIONS

The present application claims benefit of the filing dates of the following U.S. provisional patent applications, the entire contents of which are incorporated herein by reference for all purposes:

provisional application Ser. No. 60/170,082, filed on Dec. 9, 1999; and provisional application Ser. No. 60/170,002, filed on Dec. 9, 1999.

BACKGROUND OF THE INVENTION

The present invention relates to video encoders/decoders, particularly, to video encoders/decoders which encode or decode video data according to any video compression/decompression standard.

Data received by a video processing and display system is typically in a compressed format. Advances in compression and decompression techniques coupled with the ability to integrate ever increasing number of transistors on a semiconductor substrate, have led to development of new systems for storage and processing of audio and video data.

Many different video compression and decompression standards currently exit. One widely known standard is JPEG (Joint Photographic Expert Group). In the JPEG standard, to compress video data, the size of the bitmapped images are reduced by discarding some of the pictorial information, though with little discernable image degradation.

Another widely known video compression standard is MPEG1 (Motion Picture Expert Group) which provides improved video quality, as well as random access, fast forward and reverse playback of video data.

A subsequently developed standard known as MPEG2 extends the basic principles of MPEG1 to a wider range of applications. The MPEG2 provides for fully digital transmission of broadcast-quality video at bit rates of 4 to 9 Mega bit per second.

In the DVD standard, which is also a known standard, MPEG2 is used for compression and decompression of video data while MUSICAM and AC-3 are used to compress and decompress audio data. A compressed data bitstream generated in accordance with the DVD standard includes interleaved data substreams, such as video substream, sub-picture unit substreams, and navigation substreams. Each substream consists of data packets having a packet header and a packet payload. The packet header, among other things, identifies the substream to which the packet belongs. The packet header also includes information specifying the payload type and size, as well as one or more compression parameters which may be required for decompression. Typically, audio data packets will be further divided into audio data frames, with each frame having a frame header and a frame payload.

To reconstruct the original data from e.g. the DVD bitstream, a DVD decompressor locates the beginning of a packet, then reads the packet header to determine the substream membership. The decompressor then routes the packet payload and portions of the packet header to the associated elementary bitstream buffer. Subsequently, the decompressor decompresses the contents of each buffer to reconstruct the original sampled data (i.e. audio, video, SPU, navigation), which is finally delivered e.g. to a display monitor and speaker.

A new video compression and decompression standard, MPEG4, has recently been established which provides for very low bit rate (VLBR) encoding of video signals.

Many of the conventional video processing systems contain a number of Integrated Circuits (IC) to decode or encode video data. Furthermore, such systems are standard-specific and, as such, are typically unable to support multiple compression standards.

Moreover, many of the conventional portable battery-operated video processing systems employ a Central Processing Unit (CPU) to decode or encode video data. In such systems, for e.g. each compressed stream of data supplied to the CPU, many CPU operations and thus many clock cycles are required to decompress the data. Therefore, to decode/encode compressed video data in such a systems, the CPU must typically run at relatively high frequencies (e.g. 800 MHz) which thereby shortens the life of the battery powering the system.

SUMMARY OF THE INVENTION

A video encoder/decoder, in accordance with one embodiment of the present invention, encodes/decodes data in accordance with any one of a number of video compression standards. When selected to compress/decompress data in accordance with one of the JPEG, MPEG1, MPEG2, MPEG4, H.261 and H.263 compression standards, the video encoder/decoder is configured only once by a processor coupled thereto. After being so configured, the video encoder/decoder continuously decodes/encodes data, in accordance with the selected standard, without requiring any additional configuration or software programming. The configuration data is stored in a configuration register disposed within the video encoder/decoder.

An optional ROM (read-only memory) stores the configuration data for each of the JPEG, MPEG1, MPEG2, MPEG4, H.261 and H.263 compression standards. The processor reads the configuration data from the ROM and loads them into the configuration register of the video encoder/decoder.

A vector pipeline unit disposed within the video encoder/decoder includes the following components: a run-length decoder, a binary arithmetic logic unit, a binary multiplier/divider 14, an accumulator, a barrel shifter, a round/modify logic blocks, a saturate logic unit, a status register and a run-length encoder. Each component of the vector pipeline unit is enabled or disabled by setting or resetting the component's associated bit(s) in the configuration register. The data supplied to a component—of the vector pipeline unit—that is disabled passes through the component unaltered. By disabling one or more components of the vector pipeline unit, power consumption is reduced and therefore the life of the battery powering the video encoder/decoder is extended.

Each of the above components performs its operation in one clock cycle to improve the throughput of the pipeline. The vector pipeline, once configured to a selected compression standard continuously receives and encodes/decodes vectors of data encoded/decoded based on the selected standard.

The run-length decoder, if enabled, operates in one several modes—one being a reserved mode—to pack the data elements of each vector into e.g. run/level pairs. Bits associated with the run-length decoder in the configuration register select the mode of the operation thereof.

The ALU, if enabled, performs one of several arithmetic and logic operations on the data it receives. Bits associated with the ALU in the configuration register select the operation performed by the ALU.

The multiplier/divider, if enabled, performs either a multiplication or a division, depending on the value of the register bits associated with the multiplier/divider in the configuration register.

The accumulator, if enabled, adds the data it receives to the data itself or to another data, depending on the value of the bits associated with the accumulator in the configuration register.

The barrel shifter, if enabled, shifts data to the right by the number of bit positions identified by the bits associated with the barrel shifter in the configuration register.

The round/modify unit, if enabled, first rounds the data it receives to the nearest integer value. Bits associated with the round logic block of the round/modify unit in the configuration register select whether the rounding is done towards or away from zero, or towards positive or negative infinity. Data so rounded data may be altered by the modify logic block of the round/modify unit to be either an odd or an even number; the data may also be altered either towards or away from zero, positive infinity or negative infinity.

The saturate logic unit, if enabled, clamps data that are higher than a saturate high value to the saturate high value and clamps data that are lower than a saturate low value to the saturate low value. Bits associated with the saturate logic block set the saturate high and low values.

The status register, if enabled, gathers statistical data on the data it receives from the saturate logic unit and supplies the statistical data to the processor. The status register may be reset by the processor. The status register by gathering and providing statistical data to the processor improves the performance of the vector pipeline unit.

The run-length encoder, if enabled, encodes the run-length of the data it receives, in accordance with one of several modes. Bits associated with the run-length encoder in the configuration register select the mode in which the run-length encoder operates.

DESCRIPTION OF THE SPECIFIC EMBODIMENTS

A video encoder/decoder, in accordance with one embodiment of the present invention, encodes/decodes video data according to any video compression standard. When encoding/decoding video data in accordance with any one of the JPEG (see "*Digital Compression and Coding of Continuous-Tone Still Images*", ISO/IEC 10918-1, 1991), MPEG1 (see "*Information Technology—Coding of moving pictures and associated audio for digital storage media at up to 1.5 Mbit/s—Part 2: Video*", ISO/IEC 11172-2: 1993(E)), MPEG2 (see "*Information Technology—Generic coding of moving pictures and associated audio—Part 2: Video*", ISO/IEC 13818-2: 1994), MPEG4 (see, "*Information technology— Coding of audio-visual objects, Part 2: Visual*", ISO/IEC 14496-2, 1999(E)), H.261 (see "*Video Codec for Audio visual services at p×64 Kb/s*", ITU-T Recommendation H.261, 1993) or H.263 (see "*Video coding for narrow telecommunication channels at <64 kbit/s*", ITU-T Recommendation H.263, 1995) compression standards, the video encode/decoder is configured once. Thereafter, the video encoder/decoder continues to process (i.e., encode or decode) vectors of data without requiring any further configuration or software programming. The video encoder/decoder may also be configured through further software programming to encode/decode data according to any other compression standard.

Figure 1:
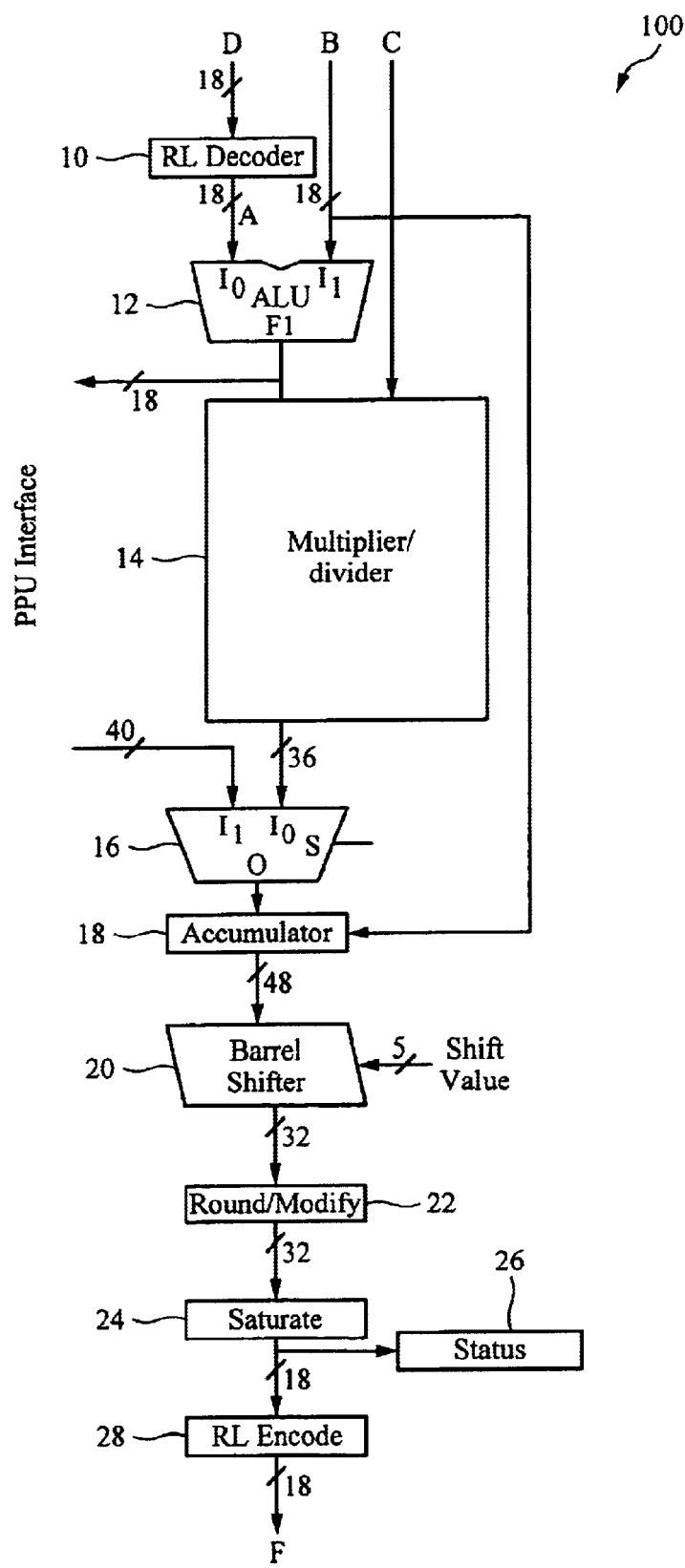
FIG. 1 shows components forming various stages of a vector pipeline unit disposed within a video encoder/decoder, in accordance with one embodiment of the present invention.

FIG. 1 shows the vector pipeline unit (VPU) 100, which is part of the video encoder/decoder that encodes/decodes video data, in accordance with one embodiment of the present invention. VPU 100 includes, among other components, run-length decoder 10, binary arithmetic logic unit (ALU) 12, binary multiplier/divider 14, accumulator 18, barrel shifter 20, round/modify logic unit 22, saturate logic unit 24, status register 26, and run-length encoder 28. It takes 1 clock cycle for each of the above components of VPU 100 to perform one of their respective operations.

VPU 100 operates on vectors of data, which in the disclosed embodiment may have up to 256 data elements, each having e.g. 18 bits. It is understood however that other embodiments may have vectors including more or fewer than 256 data elements each of which may have more or fewer than 18 bits.

The video encoder/decoder 150 (shown in FIG. 2)—in which VPU 100 of FIG. 1 is disposed—includes a 128-bit configuration register which includes register bits for enabling or disabling as well as controlling the operation of any one of the run-length decoder 10, ALU 12, binary multiplier/divider 14, accumulator 18, barrel shifter 20, round/modify logic unit 22, saturate logic unit 24, status register 26, and run-length encoder 28. Table 1 below includes a brief description of each bit of the configuration register. More detailed description of the relevant bits are described below.

TABLE 1

| Bits | Description |
|---|---|
| 0 | Run-length Decode enable |
| 1 | Binary ALU enable |
| 2 | Multiplier/Divider enable |
| 3 | Accumulator enable |
| 4 | Shifter enable |
| 5 | Round enable |
| 6 | Modify enable |
| 7 | Saturation enable |
| 8 | Status enable |
| 9 | Run-length Encode enable |
| 10 | SIMD mode |
| 18:11 | Vector length |
| 20:19 | Run-length Decode opcode |
| 21 | Level format |
| 22 | Level format convert flag |
| 23 | DC Skip flag |
| 27:24 | Binary ALU opcode |
| 28 | Binary ALU constant select |
| 37:29 | Binary ALU constant |
| 39:38 | Multiply/Divide opcode |
| 40 | Multiply/Divide constant select |
| 49:41 | Multiply/Divide constant |

TABLE 1-continued

| Bits | Description |
|---|---|
| 57:50 | Accumulator period |
| 58 | Vector Accumulate mode |
| 59 | Accumulate PPU input |
| 60 | Reset accumulator flag |
| 65:61 | Shift value |
| 67:66 | Round opcode |
| 70:68 | Modify opcode |
| 88:71 | Saturation low value |
| 106:89 | Saturation high value |
| 109:107 | Vector Compare opcode |
| 118:110 | Vector Compare value |
| 120:119 | Run-length Encode opcode |
| 126:121 | Maximum run length |
| 127 | Reserved |

Data supplied and processed by VPU 100 may be in two's complement or in sign-and-magnitude format. Furthermore, as shown in Table 1 above, bits 18:11 define the vector length, i.e., the number of data elements in the data vector being processed.

Table 2 below indicates the values written to the respective bits of the configuration register for encoding of data in accordance with each of the designated data compression standards.

In Table 2, data compression standard MPEG1 intra is shown in two separate columns to indicate that to be encoded according to this compression standard, data is passed—and processed—through the various components of VPU 100 twice. During the first pass, the configuration register bits assume the values show in MPEG1 intra[1] column of Table 2. During the second pass, the configuration register bits assume the values show in MPEG1 intra[2] column of Table 2. The two passes for MPEG-1 forward quantization are required because VPU 100 can only divide by an 8-bit unsigned value. In the first pass, the DCT coefficient (describe below) are divided by the 5-bit quantizer-scale value. In the second pass, the DCT coefficients are divided by the corresponding entries of the quantizer matrix.

Table 3 below indicates the values written to the respective bits of the configuration register for decoding of data in accordance with each of the designated data compression standards.

TABLE 2

| Bits | Description | MPEG4 intra | MPEG4 Inter | JPEG | MPEG1 intra[1] | MPEG1 intra[2] | MPEG1 inter |
|---|---|---|---|---|---|---|---|
| 0 | Run-length Decode enable | 0 | 0 | 0 | 0 | 0 | 0 |
| 1 | Binary ALU enable | 0 | 1 | 0 | 1 | 0 | 0 |
| 2 | Multiplier/Divider enable | 1 | 1 | 1 | 1 | 1 | 1 |
| 3 | Accumulator enable | 0 | 0 | 0 | 0 | 0 | 0 |
| 4 | Shifter enable | 0 | 0 | 0 | 0 | 0 | 0 |
| 5 | Round enable | 0 | 0 | 0 | 0 | 0 | 0 |
| 6 | Modify enable | 0 | 0 | 0 | 0 | 0 | 0 |
| 7 | Saturation enable | 1 | 1 | 1 | 1 | 1 | 1 |
| 8 | Status enable | 1 | 1 | 1 | 0 | 1 | 1 |
| 9 | Run-length Encode enable | 1 | 1 | 1 | 0 | 1 | 1 |
| 10 | SIMD mode | 0 | 0 | 0 | 0 | 0 | 0 |
| 18:11 | Vector length | 64 | 64 | 64 | 64 | 64 | 64 |
| 20:19 | Run-length Decode opcode | 0 | 0 | 0 | — | — | — |
| 21 | Level format | 1 | 1 | 1 | 1 | 1 | 1 |
| 22 | Level format convert flag | 0 | 0 | 0 | — | — | — |
| 23 | DC skip flag | 1 | 0 | 1 | 1 | 1 | 0 |
| 27:24 | Binary ALU opcode | — | 0xF | — | 0xF | — | — |
| 28 | Binary ALU constant select | — | 1 | — | 1 | — | — |
| 37:29 | Binary ALU constant | — | Qp/2 | — | Qscale/2 | — | — |
| 39:38 | Multiply/Divide opcode | 2 | 2 | 2 | 2 | 2 | 2 |
| 40 | Multiply/Divide constant select | 1 | 1 | 0 | 1 | 0 | 1 |
| 49:41 | Multiply/Divide constant | 2Qp | 2Qp | — | Qscale | — | 2Qscale |
| 57:50 | Accumulator period | — | — | — | — | — | — |
| 58 | Vector Accumulate mode | — | — | — | — | — | — |
| 59 | PPU input | — | — | — | — | — | — |
| 60 | Reset accumulator flag | — | — | — | — | — | — |
| 65:61 | Shift value | — | — | — | — | — | — |
| 67:66 | Round opcode | 00 | 00 | 01 | — | — | — |
| 70:68 | Modify opcode | — | — | — | — | — | — |
| 88:71 | Saturation low value | 0x3F800 | 0x3F800 | 0x3FC01 | 0x3F800 | 0x3F800 | 0x3F800 |
| 106:89 | Saturation high value | 0x007FF | 0x007FF | 0x003FF | 0x007FF | 0x007FF | 0x007FF |
| 109:107 | Vector Compare opcode | — | — | — | — | — | — |
| 118:110 | Vector Compare value | — | — | — | — | — | — |
| 120:119 | Run-length Encode opcode | 1 | 1 | 2 | 0 | 0 | 0 |
| 126:121 | Maximum run length | 64 | 64 | 16 | — | 64 | 64 |
| 127 | Reserved | — | — | — | — | — | — |

TABLE 3

| Bits | Description | MPEG4 intra | MPEG4 Inter | JPEG |
|---|---|---|---|---|
| 0 | Run-length Decode enable | 1 | 1 | 1 |
| 1 | Binary ALU enable | 1 | 1 | 0 |
| 2 | Multiplier/Divider enable | 1 | 1 | 1 |
| 3 | Accumulator enable | 0 | 0 | 0 |
| 4 | Shifter enable | 0 | 0 | 0 |
| 5 | Round enable | 0 | 0 | 0 |
| 6 | Modify enable | 1 | 1 | 0 |
| 7 | Saturation enable | 1 | 1 | 1 |
| 8 | Status enable | 1 | 1 | 0 |
| 9 | Run-length Encode enable | 0 | 0 | 0 |
| 10 | SIMD mode | 0 | 0 | 0 |
| 18:11 | Vector length | 64 | 64 | 64 |
| 20:19 | Run-length Decode opcode | 1 | 1 | 2 |
| 21 | Level format | 1 | 1 | 0 |
| 22 | Level format convert flag | 1 | 1 | 0 |
| 23 | DC skip flag | 1 | 0 | 1 |
| 27:24 | Binary ALU opcode | 0xE | 0xE | — |
| 28 | Binary ALU constant select | 0 | 0 | — |
| 37:29 | Binary ALU constant | 0 | 0 | — |
| 39:38 | Multiply/Divide opcode | 0 | 0 | 0 |
| 40 | Multiply/Divide constant select | 1 | 1 | 0 |
| 49:41 | Multiply/Divide constant | Qp | Qp | — |
| 57:50 | Accumulator period | 0 | 0 | — |
| 58 | Vector Accumulate mode | 0 | 0 | — |
| 59 | PPU input | 0 | 0 | 0 |
| 60 | Reset accumulator flag | 0 | 0 | 0 |
| 65:61 | Shift value | 0 | 0 | 0 |
| 67:66 | Round opcode | 0 | 0 | 0 |
| 70:68 | Modify opcode | 0x4 | 0x4 | 0 |
| 88:71 | Saturation low value | 0x3F800 | 0x3F800 | 0x3FC01 |
| 106:89 | Saturation high value | 0x007FF | 0x007FF | 0x003FF |
| 109:107 | Vector Compare opcode | 0 | 0 | 0 |
| 118:110 | Vector Compare value | 0 | 0 | 0 |
| 120:119 | Run-length Encode opcode | 0 | 0 | 0 |
| 126:121 | Maximum run length | 64 | 64 | 16 |
| 127 | Reserved | — | — | — |

Figure 2:
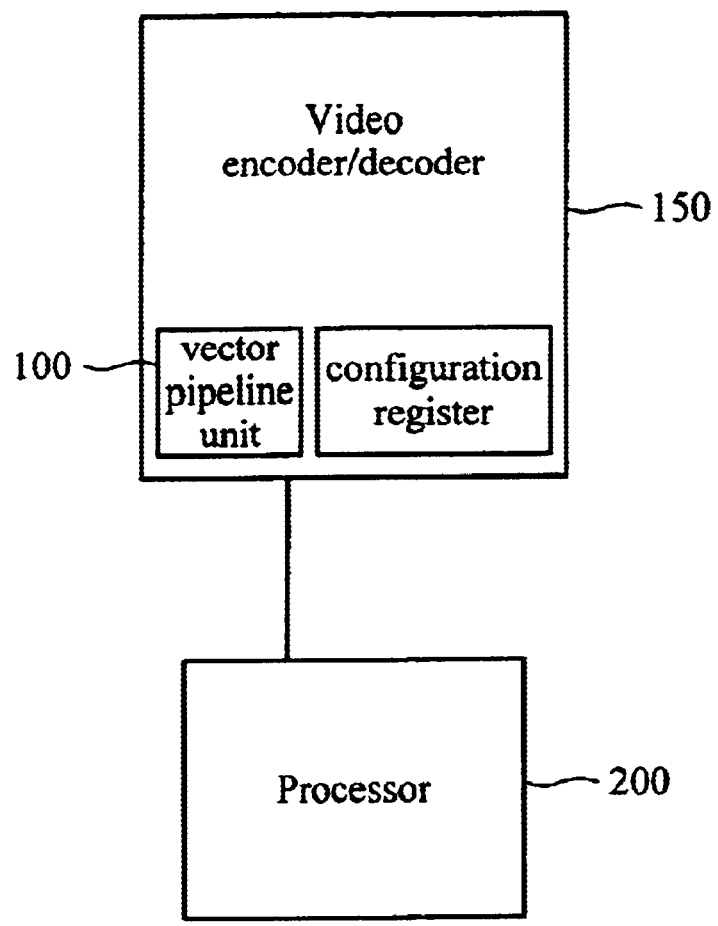
FIG. 2 shows a processor coupled to the video encoder/decoder of FIG. 1, in accordance with one embodiment of the present invention.

FIG. 2 shows a processor 200 coupled to video encoder/decoder 150, in accordance with one embodiment of the present invention. Advantageously, in accordance with the present invention, video encoder/decoder 150 is configured only once to encode/decode data in accordance with any one of the JPEG, MPEG1, MPEG2 or MPEG4, H.261 or H.263 compression standards. To configure video encoder/decoder 150 to encode/decode data according to a selected one of the above compression standards, processor 200 loads video encoder/decoder 150's configuration register with the configuration data for the selected compression standard. After being so configured, video encoder/decoder 150 continuously decodes/encodes data, in accordance with the selected compression standard, without requiring any additional configuration or software programming. For example, to decode data compressed in accordance with the JPEG standard, processor 200 loads the respective bits of the configuration register with the data shown in column labeled JPEG of Table 3. Thereafter, video encoder/decoder 150 continuously decodes JPEG compressed data vectors without requiring any additional configuration or software programming.

Figure 3:
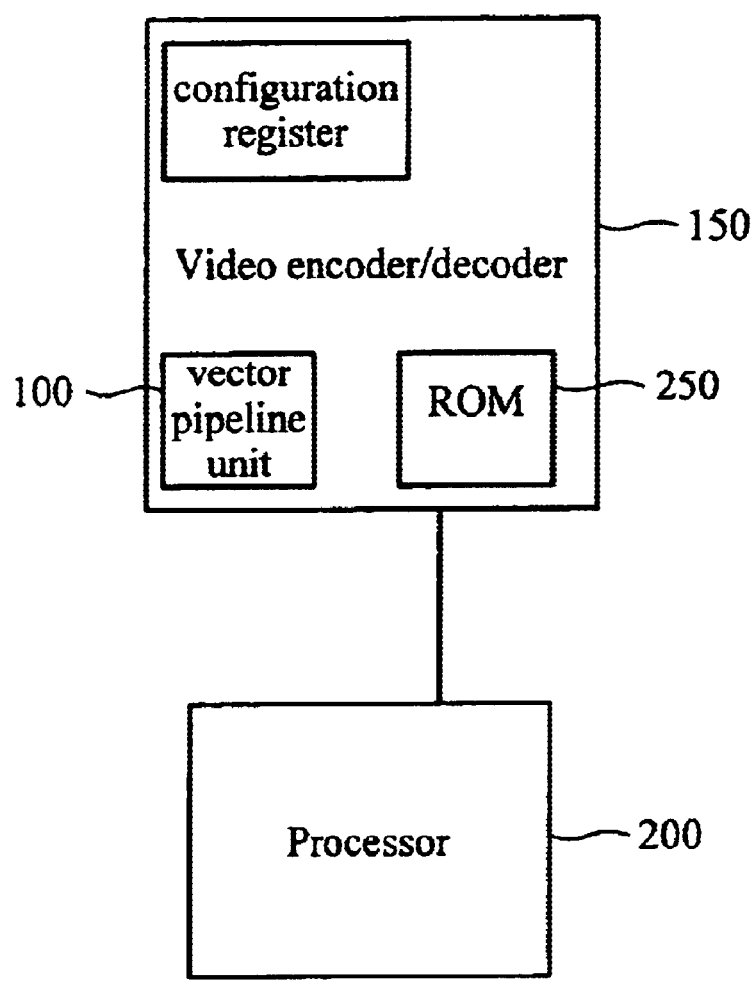
FIG. 3 shows a ROM disposed within the video encoder/decoder of FIG. 1, in accordance with another embodiment of the present invention.

FIG. 3 shows processor 200 coupled to video encoder/decoder 150 in which ROM 250, in accordance with another embodiment of the present invention, is disposed. In the embodiment disclosed in FIG. 3, the configuration data for each of the JPEG, MPEG1, MPEG2 or MPEG4, H.261 or H.263 compression standards is stored in ROM (read-only memory) 250. In accordance with this embodiment, processor 200, reads the configuration register bits for the selected compression standard from ROM 250—knowing where such data is stored in the memory—and loads the configuration register with data read from ROM 250. Thereafter, no further programming or configuration of video encoder/decoder 150 is required for continuous encoding/decoding of data for the selected standard.

Referring to FIG. 1, the first stage of data processing in VPU 100 is carried out by run length decoder 10, which is enabled or disabled respectively by the value written to bit 0 of the configuration register. Signal D (also referred to hereinbelow as word D or data D) which is e.g. an 18-bit word, is received and processed as a packed run/level pair by run-length decoder 10, in accordance with one of the run-length decoding modes shown in Table 4 below, and thereafter supplied as data A to the output terminals of run-length decoder 10. The Run-length Decoded opcode bits 20:19 of the configuration register select the run-length decoding mode.

TABLE 4

| Mode | Packing |
|---|---|
| 00 | 6-bit run, 12-bit level |
| 01 | 6-bit run, 1-bit last pair flag, 11-bit level |
| 10 | 4-bit run, 4-bit magnitude category, 10-bit residual |
| 11 | Reserved |

Mode 00 is selected for decoding the run-length of data compressed in accordance with MPEG1 or MPEG2 compression standards. In mode 00, run length decoder 10 causes a 6-bit run value—corresponding to the number of zeroes preceding a non-zero value in the run/level packed—to be inserted before each 12-bit level value. If the 18-bit input data D applied to run length decoder 10 is zero, the run-length decoding terminates for the vector being decoded.

When mode 01 is selected, run-length decoding is carried out for data compressed in accordance with MPEG4, H.261 or H.263 compression standards. In mode 01, a 6-bit run value is inserted before each 11-bit level value for each run/level packed pair. The number of run/level pairs is equal to the number of data elements in the vector. In mode 01 a 1-bit flag, called last pair flag bit, is used to denote the last element of the vector being decompressed. In mode 01, the run-length decode operation terminates when a 1 is detected in the last pair flag bit.

When mode 10 is selected, run-length decoding is carried out for data compressed in accordance with the JPEG compression standard. In binary mode 10, 4 bits denote the run value; 4 bits denote the magnitude category; and 10-bits denote the residual. The 4-bit magnitude category defines the number of bits required to represent the encoded values. The residual represents the possible values that can be represented by the magnitude category. Table 5, shown below, list the magnitudes and their associated residual values when mode 10 mis selected.

TABLE 5

| Magnitude | Residual Values |
|---|---|
| 0 | 0 |
| 1 | −1,1 |
| 2 | −3, −2,2,3 |
| 3 | −7,−6,−5,−4,4,,5,6,7 |
| 4 | −15,−14, . . . , −9,−8,8,9, . . . ,14,15 |
| 5 | −31,−30, . . . ,−17,−16,16,17, . . . ,30,31 |
| 6 | −63,−62, . . . ,−33,−32,32,33, . . . 62,63 |
| 7 | −127,−126, . . . ,−65,−64,64,65, . . . ,126,127 |
| 8 | −255,−254, . . . ,−129,−128, 128,129, . . . ,254,255 |
| 9 | −511,−510, . . . ,−257,−256,256,257, . . . ,510,511 |
| 10 | −1023,−1022, . . . ,−513,−512,512,513, . . . ,1022,1023 |
| 11 | −2047,−2046, . . . ,−1025,−1024,1024,1025, . . . ,2046,2047 |
| 12 | −4095,−4094, . . . ,−2049,−2048,2048,2049, . . . ,4094,4095 |
| 13 | −8191,−8190, . . . ,−4097,−4096,4096,4097, . . . ,8190,8191 |
| 14 | −16383,−16382, . . . ,−8193,−8192,8192,8193, . . . ,16382,16383 |
| 15 | −32767,−32766, . . . ,−16385,−16384,16384,16385, . . . ,32766,32767 |
| 16 | 32768 |

If the 18-bit data applied to run length decoder 10 is zero in mode 10, the run-length decoding terminates for the vector being decoded. Mode 11 is a reserved mode.

Bit 21 of the configuration register is the level format bit which sets the level format of the data received and processed. If bit 21 is set to low, data is in two's complement form. If bit 21 is set high, data is in sign-and-magnitude form.

Bit 23 of the configuration register is the DC skip flag. If the DC skip flag is set to high, the first data element of the vector is skipped and thus flows through the VPU 100 unaltered. The term DC refers to the lowest frequency of a DCT transformation (for a description of the DCT transformation see "*A. K Jain, Fundamentals of Digital Image Processing*", Englewoods Cliffs, N.J.: Prentice Hall (1989)) which is a transformation algorithm used to transform the compressed data elements—which represent pixel values—to values in frequency domain.

Run-length decoder 10 is enabled only if the vector being decoded has up to 64 elements—as determined by bits 18:11 of the configuration register.

The 18-bit run-length decoded data A is supplied to terminal 10 of binary ALU 12 as its first operand. The second operand supplied to ALU 12 is either an 18-bit data B or an 8-bit constant value (not shown in FIG. 1). Bit 1 of the configuration register enables or disables ALU 12.

Bit 28 of the configuration register selects between data B and the constant value to be applied to the second operand of ALU 12. If bit 28 of the configuration register is set to high, an 8-bit constant value is selected as the second operand of ALU 12, otherwise, data B is selected as the second operand of ALU 12. Bits 37:29 of the configuration register set value of the constant when it is so selected as the second operand of ALU 12.

ALU 12 executes one of the sixteen two-operand operations shown in Table 6 below. Bit 27:24 of configuration register select the opcode executed by ALU 12. The result of each of the following operations is supplied to the output terminal F1 of ALU 12. It is understood that in the above Table 6, E represents either data B or the 8-bit constant, depending on whether bit 28 of the configuration register is set to low or high.

TABLE 6

| Opcode | Operation |
|---|---|
| 0000 | F1 = 0 |
| 0001 | F1 = bitwise AND of A and E |
| 0010 | F1 = bitwise NAND of A and E |
| 0011 | F1 = bitwise OR of A and E |
| 0100 | F1 = bitwise NOR of A and E |
| 0101 | F1 = bitwise XOR of A and E |
| 0110 | F1 = bitwise XNOR of A and E |
| 0111 | F1 = bitwise logic inverse of E |
| 1000 | F1 = A + E |
| 1001 | F1 = A − E |
| 1010 | F1 = \|A − E\| |
| 1011 | F1 = \|A\| + \|E\| |
| 1100 | F1 = A +/−E (packed butterfly) |
| 1101 | F1 = A + $(-1)^{i[N]+k)}$ * B |
| 1110 | F1 = (A<0)?2 * A-1:2 * A + 1 |
| 1111 | F1 = (A<0)?A + E:A − E |

When binary operation code (opcode) is selected 0000, ALU 12 supplies an 18-bit value of 0. When binary mode 0001 is selected, ALU 12 executes a bitwise AND operation on words A and E When binary opcode 0010 is selected, ALU 12 executes a bitwise NAND operation on words A and E When binary opcode 0011 is selected, ALU 12 executes a bitwise OR operation on words A and E When binary opcode 0100 is selected, ALU 12 executes a bitwise NOR operation on words A and E When binary opcode 0101 is selected, ALU 12 executes a bitwise XOR operation on words A and E. Wen binary opcode 0110 is selected, ALU 12 executes a bitwise XNOR operation on words A and E. When binary opcode 0111 is selected, ALU 12 executes a bitwise logic inverse operation on words A and E. When binary opcode 1000 is selected, ALU 12 adds words A and E. When binary opcode 1001 is selected, ALU 12 subtracts word E from A. When binary opcode 1010 is selected, ALU 12 supplies the absolute value of the result of the subtraction of word E from A. When binary opcode 1011, ALU 12 adds the absolute values of words A and E.

When binary opcode 1100 is selected, ALU 12 executes a packed butterfly operation. In the packed butterfly operation, both the sum A+E and the difference A−E are generated. Next, the most significant bits of the sum A+E operation are packed into and form the most significant nine bit positions of the packed butterfly operation result while the most significant bits of the difference A−E operation are packed into and form the least significant nine bits of the packet butterfly operation result.

When binary opcode 1101 is selected, similar bit positions of words A and B are either added, or subtracted. In Table 6, parameter N is a 4-bit number representing the Nth bit position of a 5-bit index number, which, in turn, represents the index number (i.e., the bit position) of each bit in words A and B; parameter k is a constant which is either a 1 or 0. When binary opcode 1101 is selected, the second operand to ALU 12 is always selected to be data word B.

An example of the operation performed by ALU 12 in mode 1101 follows. Assume, for simplicity, that each of the words A and B is an 8-bit word. Further assume that N and k are both equal to 0. Accordingly, the 1101 opcode yields the following result—the

| |
|---|
| F1[0] = A[0] + B[0] |
| F1[1] = A[1] − B[1] |
| F1[2] = A[2] + B[0] |
| F1[3] = A[3] − B[3] |
| F1[4] = A[4] + B[4] |
| F1[5] = A[5] − B[5] |
| F1[6] = A[6] + B[6] |
| F1[7] = A[7] − B[7] |

For another example of the 1101 opcode, assume that N and k are both equal to 1. Accordingly:

| |
|---|
| F1[0] = A[0] − B[0] |
| F1[1] = A[1] − B[1] |
| F1[2] = A[2] + B[0] |
| F1[3] = A[3] + B[3] |
| F1[4] = A[4] − B[4] |
| F1[5] = A[5] − B[5] |
| F1[6] = A[6] + B[6] |
| F1[7] = A[7] + B[7] |
| F1[8] = A[8] − B[8] |

When binary opcode 1110 is selected, if data A has a value less than 0, ALU 12 generates data having a value equal to (2*A−1), otherwise, ALU 12 generates data having a value equal to (2*A+1), where * denotes a multiplication operation.

When binary opcode 1111 is selected, if data A has a value less than 0, ALU 12 adds words A and B, otherwise, ALU 12 subtracts word B from data word A.

ALU 12 supplies its 18-bit output data F1 to multiplier/divider 14, which optionally receives a second data C. Bit 3 of the configuration register enables or disables multiplier/divider 14 and bits 39:38 of the configuration register select between one of the four operations that multiplier/divider 14 performs, as shown in Table 7 below.

TABLE 7

| Opcode | Operation |
|---|---|
| 00 | F2 = F1 * C |
| 01 | F2 = F1 * F1 |
| 10 | F2 = F1/C |
| 11 | Reserved |

The second data received by multiplier/divider 14 is either a constant value or a vector data. Bit 40 of the configuration register selects between a constant or a vector data to be assigned to C. If bit 40 of the configuration register is set to high, C is selected to have a constant value. Bits 49:41 of the configuration register set the value of C when C is selected to have a constant value.

When opcode 00 is selected, multiplier/divider 14 multiplies the 18-bit data F1 with the 18-bit data C. When opcode 01 is selected, multiplier/divider 14 multiplies data F1 by itself so as to square data F1. When opcode 10 is selected multiplier/divider 14 divides data F by data C. When dividing F1 by C, only the least significant 8-bits of data C are used. Accordingly, the highest value that F1 may be divide by is 255. The multiplication operation for each of the opcodes 00 and 01 yields a 36-bit data. The division operation yields an 18-bit data, which is subsequently sign-extended to 36 bits.

A shifter (not shown) disposed within multiplier/divider 14 shifts data to the right as a part of the division operation. Bit 4 of the configuration register enables or disables the shifter.

When a constant value is selected for word C, the multiplication operation carried out in mode 01 yield a 26-bit data. Opcode 11 is reserved.

The 36-bit data generated by multiplier/divider 14 is applied to terminal 10 of multiplexer 16, which receives a 40-bit data—from video encoder/decoder 150—at its other input terminal I1.

Bit 59 of the configuration register is applied to the select terminal S of multiplexer which selects from and thereby transfers one of the two data received by multiplexer 16 to the multiplexer's output terminal O. Multiplexer 16 thereby enables the 40-bit data it receives form the other blocks within video encoder/decoder 150 to bypass run length decoder 10, ALU 12 and multiplier/divider 14 stages of VPU 100.

Data supplied by multiplexer 16 is received by accumulator 18. Bit 3 of the configuration register enables or disables accumulator 18. Accumulator 18 operates in two mode, normal mode and the vector accumulate mode; bit 58 of the configuration register selects between these two modes. Bits 50–57 of the configuration register define the number of clock cycles (i.e., the accumulator period) between each two consecutive resets of accumulator 18. Bit 60 of the configuration register is the reset accumulator flag bit. If the reset accumulator flag bit is set to high, at the start of processing the next vector, the accumulator is reset to zero, otherwise, the accumulator value is not reset and thus maintains its value.

When accumulator 18 is not in the vector accumulate mode, accumulator 18 adds the data it receives form multiplexer 16 to the same data to thereby generate a 48-bit at) data. If accumulator 18 is in the vector accumulate mode, accumulator 18 adds the data it receives form multiplexer 16 to data B to thereby generate a 48-bit data. Both in the vector accumulator mode and in the normal mode, accumulator 18 sign-extends the result of its operation to achieve a 48-bit data.

Accumulator 18 reduces the size of the output data vector it generates relative to the input data vector it receives by a factor equal to the 8-bit value of the configuration register bits 57:50. For example, if the data vector being processed by VPU 100 has e.g. 64 data elements, with each data element having e.g. 36 bits, assuming the field period of the accumulator is equal to four(i.e., the configuration register bits 57:50 are 00001000), then accumulator 18 generates a 16-element vector each containing the accumulated sums of four elements.

When accumulator 18 operates in the vector accumulate mode, the 18-bit B is first sign-extended to 36 bits so as to match the bit-width of accumulator 18. Thereafter accumulator 18 adds the data it receives from multiplexer 16 to the sign-extended data B.

Barrel sifter 20 receives and shifts to the right by a maximum of 32 binary positions, the 48-bit data that is generated and supplied thereto by accumulator 18. Configuration bit register 65:61 provide a 5-bit value designating the number of binary position by which the 48-bit data received by barrel shifter 20 are shifted to the right. Binary number—corresponding to bits 65:61 of the configuration register—00000 indicates a right shift of one, with subsequent increase in the value of the number resulting in an increase in the number of right shifts. For example, binary number 000100 shifts the 48-bit data 4 positions to the right and binary number 111111 shifts the 48-bit data 32 positions to the right.

Round/modify logic unit 22 includes a round logic block and a modify logic block. Round/modify unit 22 receives the 32-bit data that is supplied thereto by barrel shifter 20 and thereafter rounds and subsequently modifies the received 32-bit data. Bits 5 and 6 of the configuration register respectively enable or disable the round and modify logic blocks of round/modify unit 22.

If enabled, the round logic block rounds the 32-bit data it receives from barrel shifter 20 to the nearest integer. If, however, the decimal portion of the 32-bit data is half-way between 0 and 1 (i.e., 0.5), then one of the four opcodes shown in table 4 is selected. Bits 67:66 of the configuration register select from one of the four possible opcodes shown in Table 8 below.

TABLE 8

| Opcode[1:0] | Rounding mode |
| --- | --- |
| 00 | Round towards zero |
| 01 | Round away from zero |
| 10 | Round towards positive infinity |
| 11 | Round towards negative infinity |

If opcode 00 is selected, then the data is rounded towards zero. Therefore, if opcode 00 is selected, data with a value of 12.5 is rounded to 12.0 and data with a value of −12,5 is rounded to −12.0.

If opcode 01 is selected, then the data is rounded away from zero. Therefore, if opcode 00 is selected, data with a value of 12.5 is rounded to 13.0 and data with a value of −12.5 is rounded to −13.0

If opcode 10 is selected, then the data is rounded towards positive infinity. Therefore, if opcode 10 is selected, data with a value of 12.5 is rounded to 13.0 and data with a value of −12.5 is rounded to −12.0.

If opcode 11 is selected, then the data is rounded towards negative infinity. Therefore, if opcode 11 is selected, data with a value of 12.5 is rounded to 12.0 and data with a value of −12.5 is rounded to −13.0.

If enabled, the modify logic block of round/modify 22 modifies the data it receives in accordance with one of the 8 opcodes listed in table 7 below. Bits 70:68 of the configuration register select from one of the four possible opcodes shown in Table 9.

TABLE 9

| Opcode[4:2] | Modification Mode |
| --- | --- |
| 000 | Force even towards zero |
| 001 | Force even away from zero |
| 010 | Force even towards positive infinity |
| 011 | Force even towards negative infinity |
| 100 | Force odd towards zero |

TABLE 9-continued

| Opcode[4:2] | Modification Mode |
| --- | --- |
| 101 | Force odd away from zero |
| 110 | Force odd towards positive infinity |
| 111 | Force odd towards negative infinity |

If opcode 000 is selected, even numbers remain unchanged but odd numbers are forced to even numbers towards zero. Therefore, e.g. numbers 2 and −2 are left unchanged; number 3 is modified to 2 and number −3 is modified to −2.

If opcode 001 is selected, even numbers remain unchanged but odd numbers are forced to even numbers away from zero. Therefore, e.g. numbers 2 and −2 are left unchanged; number 3 is modified to 4 and number −3 is modified to −4.

If opcode 010 is selected, even numbers remain unchanged but odd numbers are forced to even numbers towards positive infinity. Therefore, e.g. numbers 2 and −2 are left unchanged; number 3 is modified to 4 and number −3 is modified to −2.

If opcode 011 is selected, even numbers remain unchanged but odd numbers are forced to even numbers towards negative infinity. Therefore, e.g. numbers 2 and −2 are left unchanged; number 3 is modified to 2 and number −3 is modified to −4.

If opcode 100 selected, odd numbers remain unchanged but even numbers are forced to odd numbers towards zero. Therefore, e.g. numbers 3 and −3 are left unchanged; number 2 is modified to 1 and number −2 is modified to −1.

If opcode 101 selected, odd numbers remain unchanged but even numbers are forced to odd numbers away from zero. Therefore, e.g. numbers 3 and −3 are left unchanged; number 2 is modified to 3 and number −2 is modified to −3.

If opcode 110 selected, odd numbers remain unchanged but even numbers are forced to odd numbers towards positive infinity. Therefore, e.g. numbers 3 and −3 are left unchanged; number 2 is modified to 3 and number −2 is modified to −1.

If opcode 111 selected, odd numbers remain unchanged but even numbers are forced to odd numbers towards negative infinity. Therefore, e.g. numbers 3 and −3 are left unchanged; number 2 is modified to 1 and number −2 is modified to −3.

The 32-bit data generated by round/modify logic unit 22 is supplied to saturate logic unit 24. Bit 7 of the configuration register enables or disables saturate logic unit 24.

When disabled, saturate logic unit 24 supplies at its output terminal the least significant 18-bits of the 32-bit data that it receives from round/modify logic unit 22.

When enabled, saturate logic unit 24 saturates the 32-bit data it receives, if the received data is outside a range defined by the low and high saturation values. If the value of the received 32-bit data is higher than the saturation high value, defined by the 18 bits of the configuration register bits 106:89, the received value is clamped to the saturation high value. If the value of the received 32-bit data is smaller than the saturation low value, defined by the 18 bits of the configuration register bits 88:71, the received value is clamped to the saturation low value. The clamped low and high values are in two's complement format.

The 18-bit data present at the output terminal of saturate logic unit 24 is supplied to input terminals of status register 26 and run-length encoder 28.

Status 26 gathers statistics on the data it receives from saturate logic unit 24 and supplies a 32-bit data containing the statistics results to processor 200. Status register 26 may also be reset by processor 200. Bit 8 of the configuration register enables or disables the status register.

The individual bits of the 32-bit data supplied by status register 26 are shown in table 10 below.

TABLE 10

| Bits | Description |
| --- | --- |
| 0 | High if all elements of the vector are zero |
| 1 | Parity bit equal to the XOR of the LSBs of all elements in the vector |
| 2 | High if a new max is found |
| 3 | High if a new min is found |
| 4 | Vector condition code |
| 5 | RLD error detect |
| 6 | Reserved |
| 7 | Reserved |
| 15:8 | Population count |
| 23:16 | Index of max |
| 31:24 | Index of min |

Bit 0 of the status register 26 is set to 1 if all the data elements in the vector being processed have zero values. If VPU 100 is configured to quantize video data containing DCT coefficients, then status bit 0, when set to high, indicates that all the DCT coefficients after quantization are zero. This status bit speeds up data processing in any one of the JPEG, MPEG, MPEG1, MPEG2, MPEG4, H.261 and H.263 compression standards.

Bit 1 of status 26 is the parity bit and corresponds to the XOR logic of the least significant bit of each of the data in the vector processed by VPU 100. Bit 1 of the status register 26 is read by processor 200 after decoding an MPEG2 vector to determine if the sum of the decoded DCT coefficients is even or odd. This determination, which is required for the mismatch control, as described in the MPEG2 specification, consists of adding or subtracting a one from the 64$^{th}$ coefficient of a vector if the sum of the reconstructed DCT coefficients are even. In accordance with this invention, bit 1 of the status register indicates to processor 200 whether the sum of the reconstructed DCT coefficients are even, without summing the decoded DCT coefficients. If bit 1 of the status register is 1, processor 200 performs a mismatch control operation, in accordance with the MPEG2 specification.

Bit 2 of status register 26 is set to high if the value of the data element being processed is higher than that of all the other data elements in the vector, i.e., the data being processed is a new maximum. Bits 23:16 of status register 26 store the index (i.e., the element number) of the data having the maximum value in the vector.

Bit 3 of status register 26 is set to low if the value of the data element being processed is lower than that of all the other elements in the vector, i.e., the data being processed is a new minimum. Bits 31:24 of status register 26 store the index of the data having the minimum value in the vector.

Bit 4 of status register 26 is a vector condition bit. Each data element of each vector is compared with a 9-bit constant, which is sign-extended to 18 bits of precision. Bits 109:107 of the configuration register determine the opcodes that is selected for the compare operation. Bits 118:110 define the value of the 9-bit constant used in the compare operation. The eight possible comparisons and their associated opcodes are listed in Table 11 below.

TABLE 11

| Opcode | Comparison |
| --- | --- |
| 000 | Element equal to zero |
| 001 | Element not equal to zero |
| 010 | Element equal to constant |
| 011 | Element not equal to constant |
| 100 | Element greater than constant |
| 101 | Element less than constant |
| 110 | Element was saturated |
| 111 | Reserved |

When binary opcode 000 is selected, comparison is made to determine if data is equal to zero. When opcode 001 is selected, comparison is made to determine if data is not equal to zero. When opcode 010 is selected, comparison is made to determine if data is equal to the 9-bit constant value (which is sign-extended to 18 bits). When opcode 011 is selected, comparison is made to determine if data is equal to the sign-extended 9-bit constant value. When opcode 100 is selected, comparison is made to determine if data is not equal to the sign-extended 9-bit constant value. When opcode 101 is selected, comparison is made to determine set if data is greater than the 9-bit constant. When opcode 110 is selected, comparison is made to determine if that data is saturated.

Opcode 110 coupled with the population count field, discussed above, indicate to the processor the number of reconstructed DCT coefficients that are saturated for being out of a specific range. When operating in MPEG4 mode, the population count field may indicate to the processor that the data is erroneous and corrective action should be taken because many of the data elements, as determined by the processor, were saturated by the saturate logic unit 24.

Opcode 111 is reserved, therefore, when this mode is selected, no comparison operation is performed. Bit 0 of status register 26, i.e., the vector condition bit, is set to 1 when a compare operation—as selected from Table 7 and applied to all the data in a vector—yields true for all the data in a vector. For example, if opcode 101 is selected from Table 7, the vector condition bit is set if each data element in the vector is saturated. Similarly, if opcode 000 is selected, the vector condition bit is set if each data in the vector is equal to 0.

Bits 15:8 of status register 26 are the population count bits, which increment by one when a comparison of each data in the vector yields true. If no comparison is performed, the population count field will not increment. For example, when opcode 110 of table 7 is selected, the population count filed returns the number of data in the vector that were saturated.

Bit 5 of status register 26 is the run-length decode (RLD) error detect. When set, bit 5 designates to the processor that the number of run-length decoded values exceeds the number of data elements in the vector, thereby indicating to the processor that the data is erroneous and corrective action should be taken.

Bits 6 and 7 of status register 26 are reserved.

Data generated by saturate logic unit 24 is also supplied to run length encoder 28. Bits 126:121 of the configuration register define the maximum run length—which is 64—used by the run-length encoder 28. When bits 126:121 of the configuration register are set to 00000, the maximum run length is equal to 1 and when bits 126:121 of the configuration register are set to 11111, the maximum run length is equal to 64.

In all of the above mentioned compression standards, except the JPEG, the maximum run length is equal to the number of elements in the vector. In the JPEG, the maximum run length is set to 16 which is smaller than the number of elements in the vector. In other compression standards, the maximum run length is 64.

Therefore, in the JPEG, if the run-length exceeds the maximum run length, e.g. two run-level pairs are generated. The first run-level pair includes a run of 15 and a level of 0. The second run-level pair includes a run which is equal to the difference between the actual run length and 16. The level is determined by the non-zero number succeeding the zeros establishing the run.

Run-length encoder 28 is enabled or disabled with bit 9 of the configuration register. Run length encoder 28, when enabled, encodes the run-length of data that is saturated to 12 bits or less. There are four run-length encoding modes—one being a reserved mode—for packing of each 18-bit data into run and level values, as is shown below in Table 12. Bits 120:119 of the configuration register are used for selecting one of the four possible modes.

TABLE 12

| Mode | Packing |
|------|---------|
| 00 | 6-bit run, 12-bit level |
| 01 | 6-bit run, 1-bit last pair flag, 11-bit sign-magnitude level |
| 10 | 4-bit run, 4-bit magnitude category, 10-bit residual |
| 11 | Reserved |

In mode 00, each 18-bit data is packed into a 6-bit run and a 12-bit pack.

In mode 01, each 18-bit data is packed in to a 6-bit run, 1-bit last pair flag and 11-bit sign-magnitude level. The last pair flag is set to 1 for the packed group forming the last non-zero value of a data.

In mode 10, each 18-bit data is packed in to a 4-bit run, 4-bit magnitude category and a 10-bit residual. Mode 11 is reserved.

When using two's complement representation via bit 21 of the configuration register, the level format bit of modes 00 and 01 is set to low. When using sign-and-magnitude representation, the level format bit is set to high. If bit 23 of the configuration register—the DC skip flag—is set to high, the first data in each vector is skipped and thus its run-length is not run encoded.

If the number of run/level pairs—generated by run-length encode 28—is less than that received by run-length decode 10, the subsequent data elements remaining in the vector will be set to zero.

Modes 00, 10 and 11 are valid modes for all vectors having 64 or fewer data elements. Mode 00 has 12 bits of precision, while both modes 10 and 11 have 11 bits of precision.

As disclosed above, bits 126:121 of the configuration register define the maximum run length of each packed pair. If the maximum run length is set to the highest value possible $L_{max}$ (i.e., 6 bits) and mode 10 is selected, then a packed pair consisting of a sequence of $L_{max}$ consecutive zeroes is coded with a run of $L_{max}$-1 bits and a level of zero.

The specific embodiments of the present invention described above are illustrative and not limitative and various modifications, alterations, alternative constructions, and equivalents thereof are also encompassed within the scope of the invention. For example, the invention is not limited by the number of data elements disposed within a vector or by the number of bits in each data element of a vector.

The invention is not limited by the mode of operation or the number or type of arithmetic or logic operations which the vector pipeline unit components perform.

The invention is not limited by the compression/decompression standard used to compress/decompress data. The present invention is not limited by any hardware gate-level implementation of the components in the vector pipeline unit.

The invention is not limited by the type of memory which stores the configuration data.

Other additions, subtractions, deletions, and modifications a to the present invention may be made thereto without departing from the scope of the present invention as is set forth in the appended claims.

What is claimed is:

1. A video encoder/decoder coupled to a processor, wherein the video encoder/decoder is configured by the processor a first time to encode/decode data in accordance with a first one of a plurality of data compression/decompression standards, and further including a vector pipeline unit comprising a run-length decoder which receives data elements of a data vector at its input terminals and decodes and supplies to its output terminals one of the data elements received thereby if the run-length decoder is disabled and a run-length of the data elements received thereby if the run-length decoder is enabled, wherein each data element comprises a plurality of bits.

2. The video encoder/decoder of claim 1, wherein the video encoder/decoder is configured by the processor a second time only if a second one of the plurality of data compression/decompression standards different from the first one of the plurality of data compression/decompression standards is selected for encoding/decoding.

3. The video encoder/decoder of claim 2 wherein the video encoder/decoder is configured by configuring a configuration register disposed within the video encoder/decoder.

4. The video encoder/decoder of claim 3 further comprising a memory which stores configuration data for each of the plurality of data compression/decompression standards, wherein the processor reads the configuration data from the memory and loads the same into the configuration register.

5. The video encoder/decoder of claim 1 wherein the run-length decoder is disabled if a bit associated therewith in the configuration register is reset.

6. The video encoder/decoder of claim 5 wherein the vector pipeline unit further comprises:

an ALU having a plurality of first input terminals which receive the data element supplied thereto by the run-length decoder, a plurality of second input terminals which receive a second data element of the vector and a plurality of output terminals, the ALU to deliver to its output terminals one of a result of a plurality of arithmetic or logic operations performed thereby if the ALU is enabled and the first data element received at its first input terminals if the ALU is disabled.

7. The video encoder/decoder of claim 6 wherein the ALU is disabled if a bit associated therewith in the configuration register is reset.

8. The video encoder/decoder of claim 6, wherein the vector pipeline unit further comprises:

a multiplier/divider having a plurality of first input terminals which receive the data supplied to the output terminals of the ALU, a plurality of second input terminals which receive a third data element of the vector, the multiplier/divider to supply to its output terminals a result of one of a plurality multiplication/division operations performed thereby if the multiplier/divider is enabled and the data received at its plurality of first input terminals if the multiplier/divider is disabled.

9. The video encoder/decoder of claim 8 wherein the multiplier/divider is disabled if a bit associated therewith in the configuration register is reset.

10. The video encoder/decoder of claim 8, wherein the vector pipeline unit further comprises:
a multiplexer having a plurality of first input terminals which receive a fourth data element, a plurality of second input terminals which receive the data supplied to the output terminals of the multiplier/divider, a third input terminal and a plurality of output terminals, wherein the third input terminal selects and transfers to the multiplexer's output terminals one of the data supplied to the multiplexer by the multiplier/divider and the fourth data.

11. The video encoder/decoder of claim 10 wherein the multiplexer transfers to its output terminals the data supplied thereto by the multiplier/divider if a bit associated with the multiplexer in the configuration register is reset.

12. The video encoder/decoder of claim 10, wherein the vector pipeline unit further comprises:
an accumulator having a plurality of first input terminals which receive the data supplied to the multiplexer's output terminals, and a plurality of second input terminals which receive the second data element of the vector, the accumulator to supply to its output terminals a result of one of a plurality of arithmetic operations performed thereby if the accumulator is enabled and the data received at its plurality of first input terminals if the accumulator is disabled.

13. The video encoder/decoder of claim 12 wherein the accumulator is disabled if a bit associated therewith in the configuration register is reset.

14. The video encoder/decoder of claim 12, wherein the vector pipeline unit further comprises:
a barrel shifter having a plurality of first input terminals which receive the data supplied to the output terminals of the accumulator, wherein the barrel shifter right shifts the data it receives at its plurality of first input terminals if the barrel shifter is enabled.

15. The video encoder/decoder of claim 14 wherein the barrel shifter supplies to its output terminals the data it receives at its plurality of first input terminals if the barrel shifter is disabled.

16. The video encoder/decoder of claim 15 wherein the barrel shifter is disabled if a bit associated therewith in the configuration register is reset.

17. The video encoder/decoder of claim 14, wherein the vector pipeline unit further comprises a round logic unit which receives the data supplied thereto by the barrel shifter and rounds the received data to a nearest integer number, wherein the
round logic unit receives the data supplied thereto by the barrel shifter and rounds the received data to a nearest integer number if the round logic is enabled, wherein the round logic unit supplies the rounded data to its output terminals.

18. The video encoder/decoder of claim 17, wherein the round logic unit delivers to its output terminals the data supplied thereto by the barrel shifter if the round logic unit is disabled.

19. The video encoder/decoder of claim 18 wherein the round logic unit is disabled if a bit associated therewith in the configuration register is reset.

20. The video encoder/decoder of claim 17, wherein the vector pipeline unit further comprises:
a modify logic unit which receives the data supplied thereto by the round logic unit and modifies the received data to one of odd and even number if the modify logic unit is enabled, wherein the modify logic unit supplies the modified data to its output terminals.

21. The video encoder/decoder of claim 20, wherein the modify logic unit delivers to its output terminals the data supplied thereto by the round logic unit if the modify logic unit is disabled.

22. The video encoder/decoder of claim 21 wherein the modify logic unit is enabled or disabled by varying a bit associated therewith in the configuration register.

23. The video encoder/decoder of claim 20, wherein the vector pipeline unit further comprises:
a saturate logic unit which receives the data supplied thereto by the modify logic unit, the saturate logic unit to saturate the received data to a saturation high value if the received data is greater than the saturation high value and if the saturate logic unit is enabled, the saturate logic unit to saturate the received data to a saturation low value if the received data is smaller than the saturation low value and if the saturate logic unit is enabled, wherein the saturate logic unit supplies to its output terminals the saturate data.

24. The video encoder/decoder of claim 23 wherein the saturate logic unit supplies to its output terminals data it receives from the output terminals of the modify logic unit if the saturate logic unit is disabled.

25. The video encoder/decoder of claim 24 wherein the saturate logic unit is enabled or disabled by varying a bit associated therewith in the configuration register.

26. The video encoder/decoder of claim 23, wherein the vector pipeline unit further comprises a status register which collects data supplied thereto by the saturate logic unit and supplies the collected data to the processor, if the status register is enabled.

27. The video encoder/decoder of claim 26 wherein the status register is enabled or disabled by varying a bit associated therewith in the configuration register.

28. The video encoder/decoder of claim 23, wherein the vector pipeline unit further comprises a run-length encoder which receives and encodes the run-length of the data that is supplied thereto by the saturate logic unit if the run-length encoder is enabled.

29. The video encoder/decoder of claim 28, wherein the run-length encoder is enabled or disabled by varying a bit associated therewith in the configuration register.

* * * * *